(12) United States Patent
Lecomte et al.

(10) Patent No.: US 6,269,094 B1
(45) Date of Patent: Jul. 31, 2001

(54) TELEPHONE TERMINAL AND METHOD OF TELEPHONE COMMUNICATION BETWEEN A CALLING TERMINAL AND A CALLED TERMINAL FOR OPTIMIZING A COST REDUCTION OF CALLS

(75) Inventors: Daniel Lecomte; Michel Coudreuse, both of Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/004,645

(22) Filed: Jan. 8, 1998

(30) Foreign Application Priority Data

Jan. 9, 1997 (FR) .................................................. 97 00139

(51) Int. Cl.$^7$ .................................................. H04L 12/66
(52) U.S. Cl. ........................................... 370/352; 370/356
(58) Field of Search ...................................... 370/352, 356; 379/88.17, 93.05, 93.14, 219, 201, 100.01; 707/10, 9

(56) References Cited

U.S. PATENT DOCUMENTS

| | | | |
|---|---|---|---|
| 5,892,764 | * | 4/1999 | Riemann et al. ..................... 370/401 |
| 6,023,700 | * | 2/2000 | Owens et al. ........................... 707/10 |
| 6,028,917 | * | 2/2000 | Creamer et al. ................. 379/100.01 |
| 6,108,405 | * | 8/2000 | Luong ................................. 379/93.11 |

FOREIGN PATENT DOCUMENTS

| | | |
|---|---|---|
| 0445452A1 | 9/1991 | (EP) . |
| WO9316564 | 8/1993 | (WO) . |

* cited by examiner

*Primary Examiner*—Wellington Chin
*Assistant Examiner*—Brenda H. Pham
(74) *Attorney, Agent, or Firm*—Sughrue, Mion, Zinn, Macpeak & Seas, PLLC

(57) ABSTRACT

A calling telephone terminal and a called telephone terminal optimize the cost reduction of real time communication via a first communication network operating in real time. The calling terminal recognizes the status of a called terminal as "real time communication" in the case of a called terminal requiring real time communication or "off-line communication" in the case of a called terminal tolerating off-line communications and constructs and temporarily stores a message off-line and then sends it to the called terminal via a second communication network operating off-line if the status of the called terminal is "off-line communication". The called terminal sends a "real time communication" or "off-line communication" status signal to a calling terminal in response to detection of an incoming call and receives and optionally stores a message sent by the calling terminal via a second communication network operating off-line if the status of the called terminal is "off-line communication".

29 Claims, 1 Drawing Sheet

TELEPHONE TERMINAL AND METHOD OF TELEPHONE COMMUNICATION BETWEEN A CALLING TERMINAL AND A CALLED TERMINAL FOR OPTIMIZING A COST REDUCTION OF CALLS

BACKGROUND OF THE INVENTION

1. Field of the Invention

The field of the invention is that of communications and in particular telephone communications.

To be more precise, the invention concerns a new approach to telephone terminals and a corresponding method of communication between a calling terminal and a called terminal.

2. Description of the Prior Art

At present, to establish a call between two terminals, the telephone number of a called terminal is entered by means of a calling terminal. The call can be a telephone call (voice transmission) or a multimedia call (voice and/or image and/or data transmission). In the conventional way, the calling terminal uses a predetermined communication network (generally the switched telephone network) to establish real time point to point communication enabling true interactivity between the two parties.

This conventional technique is advantageous in terms of user friendliness in particular. On the other hand, under some conditions it proves very costly. The call is generally billed according to duration and distance. The time period used as the basis for billing is sometimes very short, in particular when communicating with other countries. In this situation, it is not uncommon for the cost of a call to be upwards of ten dollars.

There are less costly communication systems. There is the INTERNET network, for example, where billing is not based on duration or distance. In the conventional way a single base unit on the telephone network enables exchange of data between Europe and Japan for hours at a time.

On the other hand, this network is often rather slow and does not provide real time information exchange, as is provided by the switched telephone network. The INTERNET is therefore essentially used to transfer data when off-line communication or at the very least a very low speed can be tolerated.

In some situations it is not necessary to set up a relatively high cost real time symmetrical call.

This applies if the called terminal is a facsimile machine, for example. The inventors have also realized that, even though this goes against received wisdom in the art, this applies also to an answering service (telephone, telematics or multimedia). It could therefore be highly feasible to set up an off-line call rather than a real time symmetrical call of higher cost.

One objective of the invention is to alleviate these various drawbacks of the prior art and to exploit the observations referred to above.

To be more precise, one objective of the present invention is to provide a calling terminal, a called terminal and a corresponding method of telephone communication between a calling terminal and a called terminal for optimizing the cost reduction of calls.

Another objective of the invention is to provide a calling terminal of the above kind that is compatible with existing called terminals and, conversely, a called terminal that is compatible with existing calling terminals.

SUMMARY OF THE INVENTION

These various objectives, and others that will emerge hereinafter, are realized in accordance with the invention by means of a calling telephone terminal for real time communication via a first communication network operating in real time including:

means for recognizing the status of a called terminal as "real time communication" in the case of a called terminal requiring real time communication or "off-line communication" in the case of a called terminal tolerating off-line communication; and means for constructing and temporarily storing a message off-line and then sending it to the called terminal via a second communication network operating off-line if the status of the called terminal is "off-line communication".

If possible (i.e. if the called terminal tells it that its status is "off-line communication", for example because an answering service is operative), the calling terminal of the invention uses a second communication network operating off-line to transmit a message to the called terminal. This reduces the cost of the call because the second network operating off-line is less costly than the first communication network operating in real time.

In this case, in accordance with the new approach of the invention, the message to be transmitted to the called terminal is not transmitted as soon it is composed. To the contrary, it is composed, formatted and possibly compensated off-line, before it is transmitted.

Apart from the saving in terms of call duration, this has the advantage of enabling a high quality message to be constructed. For example, if the called terminal is an answering service, thought can be given to the content of the message, which can be started over if necessary, and so on. This obviously applies to an even greater degree if the message is complex (sound, image, data, etc).

By operation off-line (or "not in real time") in the present context is meant either true off-line operation (the message from the calling terminal is not sent immediately to the called terminal) or "slowed down" operation (the message from the calling terminal is sent to the called terminal virtually in real time, but always at a lower speed than if it were sent over the first network operating in real time).

Note that the calling terminal of the invention is compatible with a conventional called terminal. If the calling terminal of the invention does not receive any status signals from the conventional called terminal it deduces that the latter can be called only via the first communication network operating in real time.

It is nevertheless clear that the cost of calls can be reduced only if the calling terminal and the called terminal are both terminals in accordance with the present invention.

The invention also consists in a called telephone terminal for real time communication via a first communication network operating in real time including:

means for sending to a calling terminal in response to detection of an incoming call a "real time communication" status message in the case of a called terminal requiring real time communication or an "off-line communication" status message in the case of a called terminal tolerating off-line communication; and means for receiving and optionally storing a message sent by the calling terminal via a second communication network operating off-line if the status of the called terminal is "off-line communication".

Thus the called terminal of the invention sends status signals to the calling terminal to tell it via which network (real time or off-line) it is preferentially accessible. In other words, the called terminal of the invention tells the calling terminal whether it is accessible via the second network operating off-line or not.

By status signals is meant either data (for example one or more status bits) or an audio signal (for example the carrier of a modem of a facsimile machine or any other predetermined audio signal).

Again, note that the called terminal of the invention is compatible with a conventional calling terminal. For a conventional calling terminal, which is unable to understand the status signals sent to it, the called terminal of the invention continues to be accessible via the first communication network operating in real time.

It is also clear that one and the same terminal can incorporate the means specific to the calling terminal of the invention and/or the means specific to the called terminal of the invention. This should be the case in most top of the range terminals incorporating a plurality of functions (multimedia terminals, for example) in any case.

It is advantageous if the first communication network is a switched telephone network and the second communication network is an "Internet" type multimedia network.

Clearly other types of network can be used for the second network operating "off-line", for example the Transpac network, a private network, etc.

The terminal can, for example, belong to the group comprising:
   telephones;
   telephone answering services;
   videophones;
   video answering services;
   telematics terminals;
   telematics answering services;
   "Internet" type terminals;
   "Internet" type servers; and
   multifunction terminals that can be consulted remotely.

The above list is not exhaustive and is intended merely to show the great diversity of applications of the inventive concept. Any type of telephone terminal is suitable if it can access a first communication network operating in real time and a second network operating off-line in send mode and/or in receive mode.

The message can include only information of a like kind (namely sound, images or data) or a mixture of information of different kinds (for example sound and images or images and data).

In one embodiment of the invention, the terminal includes means for forcing the status of the called terminal to "off-line communication".

In this way, the user of the called terminal decides to tolerate off-line operation (second network) in a situation where operation in real time (first network) would normally have been adopted. This could be a very costly call to another country, for example, when off-line operation can be tolerated.

In this case, the terminal preferably includes means for switching from real time communication via the first communication network to off-line communication via the second network and/or vice versa.

For example, during conversation via a call set up on the first network, one can switch to the second network to send a fax or to transfer a file. Conversely, one can switch back to the first network, for example to enhance the quality of a conversation.

The invention also consists in the corresponding method of telephone communication between a calling terminal and a called terminal for real time communication via a first communication network operating in real time including the following steps:
   sending a ringing signal from the calling terminal to the called terminal;
   detection of the ringing signal by the called terminal;
   sending by the called terminal to the calling terminal of a "real time communication" status signal in the case of a terminal requiring real time communication or an "off-line communication" status signal in the case of a called terminal tolerating off-line communication if the called terminal includes means for distinguishing between these states;
   using a call via the first network if the status is "real time communication" or if one of the terminals does not include means for distinguishing these states;
   otherwise:
      constructing and temporarily storing a message in the calling terminal;
      sending the message to the called terminal via a second communication network operating off-line; and
      reception and optional storage of the message by the called terminal.

Advantageously, the step of using a call via the first network is also executed before and/or after the step of sending the message via the second network.

In other words, the facility can be provided to switch from one network to the other during a call.

Other features and advantages of the invention will become apparent from a reading of the following description of one preferred embodiment of the invention given by way of non-limiting illustrative example only and from the accompanying drawing.

DETAILED DESCRIPTION OF THE PREFERRED EMBODIMENT

For simplicity, the remainder of the description assumes that one of the terminals is a calling terminal 1 and the other is a called terminal 2. It is nevertheless clear that one and the same terminal can be a calling terminal and a called terminal at one and the same time.

The invention is not limited to any particular type of telephone terminal and can be applied in all cases where the same terminal can make calls via two separate networks, one of these networks operating in real time and the other off-line.

For example calling and/or called telephone terminals of the invention belong to the following (non-exhaustive) list: a telephone, a telephone answering service, a videophone, a video answering service, a telematics terminal (e.g. a Minitel (registered trademark) terminal), a telematics answering service, an "Internet" type terminal, an "Internet" server, a multifunction terminal that can be consulted remotely, etc.

Figure 1:
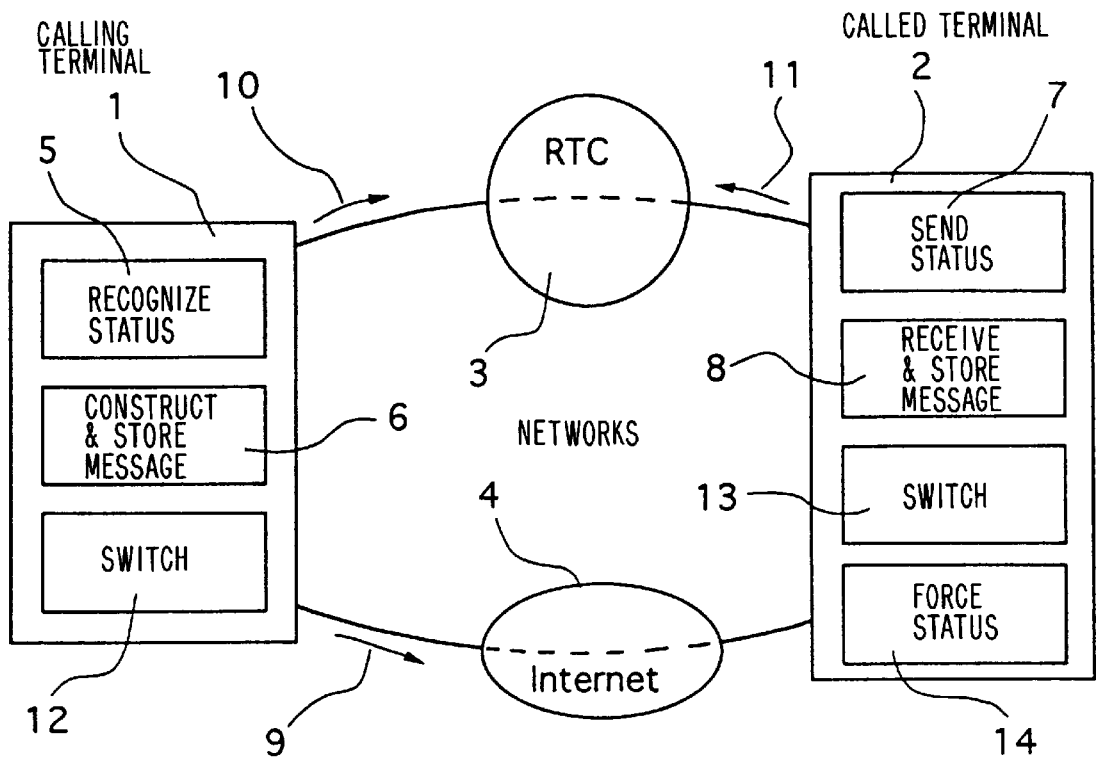
FIG. 1 is a schematic representation of one particular embodiment of a calling terminal and a called terminal of the invention illustrating one example of a call between the two terminals.

As shown in FIG. 1 the calling terminal 1 and the called terminal 2 are both connected to a first network 3 operating in real time (for example the switched telephone network RTC) and to a second network 4 operating off-line (for example an "Internet" type multimedia network).

The cost of a call via the second (off-line) network 4 is generally lower than via the first (real time) network 3. The general principle of the invention is therefore to use the second network 4 in place of the first network 3 when this is possible. To this end the calling terminal 1 and the called terminal 2 each comprise dedicated means.

The calling terminal 1 includes:
means 5 for recognizing the status of a called terminal as:
"real time communication" in the case of a called terminal requiring real time communication, or:
"off-line communication" in the case of a called terminal tolerating off-line communication; and
means 6 for constructing and temporarily storing a message off-line and then sending it to the called terminal 2 via a second communication network 4 if the status of the called terminal 2 is "off-line communication".

The message 9 that the calling terminal 1 sends to the called terminal 2 via the second network 4 can contain various type of information. For example, if the called terminal 2 is a telephone answering service, the message 9 can contain only sound (voice message). The message 9 can equally contain only data, for example if the called terminal 2 is a telematics answering service. To give another example, the message 9 can include sound, images and data if the called terminal is an Internet type terminal. Generally, the message 9 includes sounds and/or pictures and/or data.

The called terminal 2 includes:
means 7 for sending a status signal 11 to the calling terminal 1 in response to detection of an incoming call (i.e. following reception of a ringing signal 10 sent by the calling terminal 1); this status signal 11 corresponds to one of the two states previously referred to, i.e. "real time communication" or "off-line communication"; and
means 8 for receiving and optionally storing a message 9 sent by the calling terminal 1 via the second communication network 4 if the status of the called terminal is "off-line communication".

The ringing signal 10 and the status signal 11 respectively sent by the calling terminal 1 and the called terminal are transmitted via the first communication network 1 on appropriate signaling channels.

In the embodiment shown in FIG. 1 the calling terminal 1 and the called terminal 2 each include means 12, 13 for switching from a real time call via the first communication network 3 to an off-line call via the second network 4 and/or vice versa. Thus the sending of a message 9 by the calling terminal 1 to the called terminal 2 via the second network 4 can be preceded and/or followed by a call via the first network 3.

The called terminal 2 optionally includes means 14 for forcing its status to "off-line communication".

Figure 2:
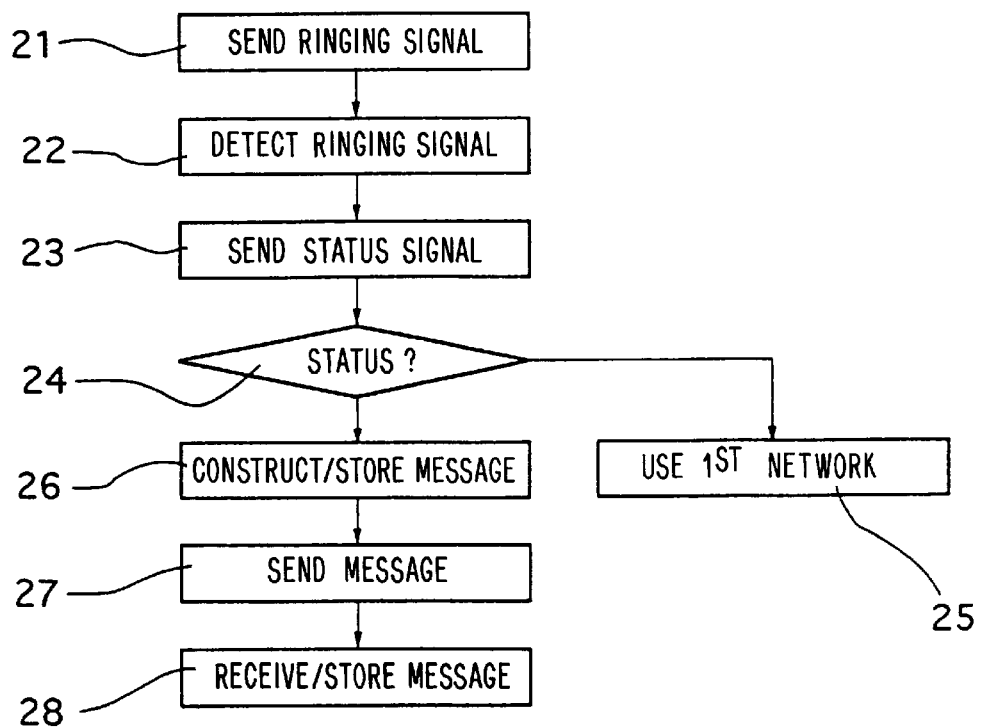
FIG. 2 shows a simplified flowchart of one particular embodiment of the method of the invention for telephone communication between a calling terminal and a called terminal.

One particular embodiment of the method of the invention for telephone communication between a calling terminal and a called terminal will now be described with reference to the simplified flowchart of FIG. 2.

The method includes the following steps:
sending (21) a ringing signal 10 from the calling terminal 1 to the called terminal 2;
detection (22) of the ringing signal 10 by the called terminal 2;
sending (23) by the called terminal 2 to the calling terminal 1 of a "real time communication" or an "off-line communication" status signal 11;

distinguishing (24) the status:
using (25) a call via the first network 3 if the status is "real time communication";
if the status is "off-line communication":
constructing and temporarily storing (26) a message 9 in the calling terminal 1;
sending (27) the message 9 to the called terminal 1 via the second communication network 4; and
reception (28) and optional storage of the message 9 by the called terminal 2.

Note that if the calling terminal 1 of the invention attempts to call a "conventional" called terminal, i.e. a called terminal having no means of sending a status signal, the calling terminal 1 uses a call via the first network 3. In other words, everything is as if the conventional called terminal had sent a "real time communication" status signal.

Note that, in a variant, if the calling terminal 1 is capable of recognizing some status indicators already in use, then the calling terminal 1 can behave as if the "conventional" called terminal were a called terminal of the invention.

For example, if the called terminal 2 is a "conventional" telephone answering service, it may send a particular carrier when it is called. If the calling terminal 1 is capable of recognizing this carrier, then this carrier can be deemed to constitute a status signal corresponding to the "off-line communication" status. Unlike the previous situation, the calling terminal 1 then uses a call via the second network 4 (without knowing from first principles whether the "conventional" called terminal is accessible via the second network 4).

There is claimed:

1. A calling telephone terminal, comprising:
means for recognizing a status of a called terminal as "real time communication" when a called terminal requires real time communication or as "off-line communication" when said called terminal is able to tolerate off-line communication;
means for constructing and temporarily storing a message off-line and then sending it to said called terminal via a second communication network operating off-line if the status of said called terminal is "off-line communication"; and
means for real time communication with said called terminal via a first communication network operating in real time if the status of said called terminal is not "off-line communication".

2. The terminal claimed in claim 1, wherein said first communication network is a switched telephone network.

3. The terminal claimed in claim 1, wherein said second communication network is an "Internet" type multimedia network.

4. The terminal claimed in claim 1, selected from the group comprising:
telephones;
telephone answering services;
videophones;
video answering services;
telematics terminals;
telematics answering services;
"Internet" type terminals;
"Internet" type servers; and
multifunction terminals that can be consulted remotely.

5. The terminal claimed in claim 1, wherein said message includes sound and/or images and/or data.

6. The terminal claimed in claim 1, including means for switching from real time communication via said first communication network to off-line communication via said second network and/or vice versa.

7. A called telephone terminal, comprising:
means for sending to a calling terminal, in response to detection of an incoming call, a "real time communication" status message when the called terminal requires real time communication or an "off-line communication" status message when the called terminal is able to tolerate off-line communication; and
means for receiving and optionally storing a message sent by said calling terminal via a second communication network operating off-line if a status of said called terminal is "off-line communication"; and
means for real time communication with said calling terminal via a first communication network operating in real time if the status of said called terminal is not "off-line communication".

8. The telephone terminal claimed in claim 7, wherein said first communication network is a switched telephone network.

9. The terminal claimed in claim 7, wherein said second communication network is an "Internet" type multimedia network.

10. The terminal claimed in claim 7, selected from the group comprising:
telephones;
telephone answering services;
videophones;
video answering services;
telematics terminals;
telematics answering services;
"Internet" type terminals;
"Internet" type servers; and
multifunction terminals that can be consulted remotely.

11. The terminal claimed in claim 7, wherein said message includes sound and/or images and/or data.

12. The terminal claimed in claim 7, further comprising means for forcing the status of said called terminal to "off-line communication".

13. The terminal claimed in claim 7, further comprising means for switching from real time communication via said first communication network to off-line communication via said second network and/or vice versa.

14. A method of telephone communication between a calling terminal and a called terminal, comprising the steps of:
sending a ringing signal from said calling terminal to said called terminal;
detecting of said ringing signal by said called terminal;
sending by said called terminal to said calling terminal of a "real time communication" status signal when said called terminal requires real time communication or of an "off-line communication" status signal when said called terminal is able to tolerate off-line communication; and
communicating between said terminals a call via said first network if said status is "real time communication" or if one of said terminals does not include means for distinguishing communication states, otherwise:
constructing and temporarily storing a message in said calling terminal;
sending said message to said called terminal via a second communication network operating off-line; and
receiving and optionally storing of said message by said called terminal.

15. The method claimed in claim 14, wherein said step of using a call via said first network is also executed before and/or after said step of sending said message via said second network.

16. A calling telephone terminal comprising:
real time communication circuitry for operating in real time via a first communication network;
circuitry operative to recognize the status of a called terminal as "real time communication" when a called terminal requires real time communication or as "off-line communication" when the called terminal is able to tolerate off-line communication;
a message generator operative to construct a message;
a memory able to temporarily store the message off-line; and
a transmitting circuit operative to send the message to the called terminal via a second communication network operating off-line if the status of the called terminal is "off-line communication."

17. A terminal as claimed in claim 16, wherein the first communication network is a switched telephone network.

18. A terminal as claimed in claim 16, wherein the second communication network is an "Internet" type multimedia network.

19. A terminal as claimed in claim 16, selected from the group comprising telephones, telephone answering services, videophones, video answering services, telematics terminals, telematics answering services, "Internet" type terminals, "Internet" type servers, and multifunction terminals that can be consulted remotely.

20. A terminal as claimed in claim 16, wherein said message comprises sound and/or images and/or data.

21. A terminal as claimed in claim 16, further comprising a switch operative to switch from real time communication via said first communication network to off-line communication via said second network and/or vice versa.

22. A called telephone terminal, comprising:
real time communication circuitry for operating in real time via a first communication network;
a detector that detects an incoming call from a calling terminal;
status transmission circuitry operative to send to the calling terminal, in response to the incoming call detection, a "real time communication" status message when the called terminal requires real time communication or an "off-line communication" status message when the called terminal can tolerate off-line communication;
a receiver that receives a message sent by the calling terminal via a second communication network operating off-line if the status of the called terminal is "off-line communication".

23. A called terminal according to claim 22, further comprising a memory that stores the message sent by the calling terminal.

24. The telephone terminal claimed in claim 22, wherein the first communication network is a switched telephone network.

25. A terminal as claimed in claim 22, wherein the second communication network is an "Internet" type multimedia network.

26. A terminal as claimed in claim 22, the terminal selected from the group comprising telephones, telephone answering services, videophones, video answering services, telematics terminals, telematics answering services, "Internet" type terminals, "Internet" type servers, and multifunction terminals that can be consulted remotely.

27. A terminal as claimed in claim 22, wherein the message includes sound and/or images and/or data.

28. A terminal as claimed in claim 22, further comprising circuitry that forces the status of the called terminal to "off-line communication."

29. A terminal as claimed in claim 22, further comprising a switch operative to switch from real time communication via said first communication network to off-line communication via said second network and/or vice versa.

* * * * *